United States Patent Office
3,157,662
Patented Nov. 17, 1964

3,157,662
CATALYSTS FOR PREPARING CARBODIIMIDES
Kenneth C. Smeltz, Wilmington, Del., assignor to E. I. du Pont de Nemours and Company, Wilmington, Del., a corporation of Delaware
No Drawing. Filed Nov. 28, 1961, Ser. No. 155,501
5 Claims. (Cl. 260—288)

This invention relates to a novel process for the preparation of carbodiimides. More particularly this invention relates to a novel catalytic process of preparing carbodiimides from isocyanates.

Carbodiimides are compounds containing the group —N=C=N—. They have a variety of uses, e.g. they are useful as catalysts for converting alcohols and acids to esters, for converting acids and amines to amides such as polypeptides and as intermediates for preparing isourea ethers, guanidines, ureas and the like. Polycarbodiimides, prepared from polyisocyanates, are also useful for preparing films, fibers and the like.

The older methods for preparing carbodiimides are rather laborious and of limited applicability. A well-known method involves reacting thioureas with mercuric oxide or the like to form the carbodiimide, mercuric sulfide and water, i.e.

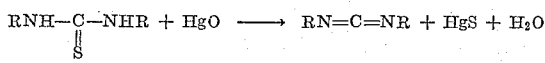

Another method involves the reaction of organic isocyanates with phosphine-imines to form carbodiimides, i.e.

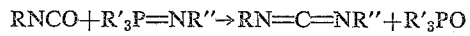

Unfortunately, the phosphine-imines are somewhat laborious to prepare. A more convenient method involves conversion of isocyanates to carbodiimides in the presence of certain phospholines or phospholine oxides, e.g.

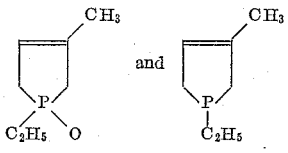

This method gives carbodiimides in excellent yields but has the disadvantage that the catalysts are rather difficult to prepare in commercial practice.

It is an object of this invention to provide a new process for the production of carbodiimides. A further object is to provide new catalysts for carbodiimide production. A still further object is to provide catalysts useful with all types of isocyanates for carbodiimide production. Other objects will appear hereinafter.

These and other objects of this invention are accomplished by the process of preparing organic carbodiimides which comprises heating an organic isocyanate and an organo-metallic catalyst together in the range of from about 100° C. to about 250° C., said catalyst has the formula $M'[R_aM^2(OR')_{4-a}]_w$ wherein $M'$ is chosen from the alkali and alkaline earth metals, $M^2$ is chosen from boron and aluminum, R and R' are Zerewitinoff active hydrogen free alkyl groups, $w$ is the valence of $M'$ and $a$ is from zero to two. The catalytic reaction evolves carbon dioxide which can be used as a guide to regulate the reaction. Optionally an organic solvent can be used for the reaction as long as the solvent is free of Zerewitinoff active hydrogen.

In carrying out the process of the present invention, any organic isocyanate, including monoisocyanates and polyisocyanates, may be used, such as aromatic, aliphatic or cycloaliphatic types. These organic isocyanates may contain other substituents; however, it is readily apparent that these substituents should not be reactive with the isocyanate group or groups. Therefore, they should not be of the active hydrogen-containing type which display activity according to the Zerewitinoff test. The isocyanates can contain from one to three isocyanate groups.

Some useful examples of the catalysts and their methods of synthesis are shown below. Other members of this subclass are readily prepared by the analgous reaction.

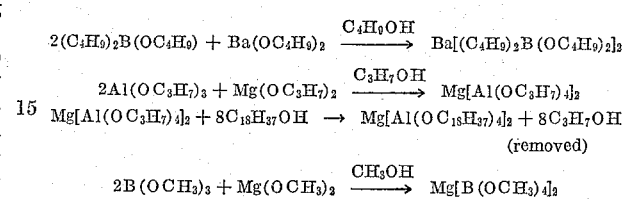

The catalyst concentration is not critical but does have an effect on the rate of the reaction of the present process. Low concentrations will catalyze the reaction at a slow rate. It is unlikely that a catalyst concentration below 0.1 mole percent would be of interest, however. Higher catalyst concentrations are useful with some of the less efficient catalysts. There is no need for any of the catalyst concentrations to exceed 10 mole percent of the isocyanate however.

The catalysts of this invention are useful for converting isocyanates to carbodiimides only in the temperature range indicated. At lower temperatures, say room temperature, most of these same catalysts cause isocyanates to trimerize to the 2,4,6-triketohexahydro-1,3,5-triazines. Also, at lower temperatures, these catalysts have tendency to convert any carbodiimide formed to dimers (2,4-diimino-1,3-diazetidines) and trimers (2,4,6-triiminohexahydro-1,3,5-triazines). The dimerization and trimerization appear to be reversible and are effectively prevented by operating at higher temperatures. It is necessary, however, to find by tests which temperature is most effective with any particular catalyst and isocyanate. It is, of course, understood that a particular set of reaction conditions will be preferred for each combination of catalyst and isocyanate and that it is impossible to delineate all such information here.

It is indicated above that the solvent, if used, and catalysts must be free of Zerewitinoff active hydrogen. A compound which contains Zerewitinoff active hydrogen reacts with methyl magnesium halide (methyl Grignard reagent) to form methane. This is the basis of the well-known Zerewitinoff test which is more fully described in "Quantitative Organic Analysis," by Niederl and Niederl (Wiley, New York, 2nd ed., p. 263 ff.). It is well known that organic isocyanates containing Zerewitinoff hydrogen cannot be prepared for they would react among themselves. Thus isocyanates containing free hydroxyl, carboxyl, mercapto, amino (containing NH), sulfonic acid, amide (containing NH), sulfonamido (containing NH) and most aliphatic nitro groups are unavailable in theory and therefore cannot be used in this invention. The aromatic isocyanates which are useful in this invention are, in general, derivatives of benzene, naphthalene, anthracene, phenanthrene, pyridine, quinoline and the like. Derivatives of benzene and naphthalene are preferred because they are more readily available. These aromatic isocyanate molecules may contain substituents such as halogen, alkoxyl groups, carboalkoxy groups, nitrile groups, nitro groups, alkyl groups and the like which are unreactive toward isocyanate groups. The aliphatic isocyanates which are useful in this invention are any of those obtained from aliphatic amines which are free from groups which react with isocyanate groups. In general, they may contain alkoxyl groups, carboalkoxy groups, nitrile groups, dialkylamino groups and the like. In general, halogenated aliphatic isocyanates are not readily available although some are known and may be used. Of course, these restrictions apply to both acyclic and cyclic aliphatic isocyanates.

Some useful examples of isocyanates are: phenyl isocyanate, o-phenyl diisocyanate, m-phenyl diisocyanate, p-phenyl diisocyanate, 1,3,5-phenyl triisocyanate, o-tolyl isocyanate, m-tolyl isocyanate, p-tolyl isocyanate, other similar alkylphenyl isocyanates containing ethyl, propyl groups etc., o-methoxyphenyl isocyanate, m-methoxyphenyl isocyanate, p-methoxyphenyl isocyanate, similar alkoxyphenyl isocyanates containing ethyl, propyl and like groups, o-chlorophenyl isocyanate, m-chlorophenyl isocyanate, p-chlorophenyl isocyanate, the corresponding bromine derivatives, o-nitrophenyl isocyanate, m-nitrophenyl isocyanate, p-nitrophenyl isocyanate, haloalkylphenyl isocyanates such as 3-chloro-2-methylphenyl isocyanate and similar isomeric compounds, alkylnitrophenyl isocyanates such as 4-methyl-3-nitrophenyl isocyanate and similar compounds, alkylphenyl polyisocyanates such as 2,4-toluene diisocyanate, 2,6-toluene diisocyanate and 2,4,6-toluene triisocyanate, other phenyl polyisocyanates such as 1-nitrophenyl-3,5-diisocyanate, diphenyl ether derivatives such as p-phenoxyphenyl isocyanate, 4,4'-diisocyanatodiphenyl ether and 3,3' - dichloro-4,4'-diisocyanatodiphenyl ether, diphenylmethane derivatives such as 4,4'-diisocyanatodiphenylmethane and 3,3'-dichloro-4,4' - diisocyanatodiphenylmethane, o - phenylphenylisocyanate, m-phenylphenyl isocyanate and p-phenylphenyl isocyanate, 1-naphthyl isocyanate, 4,4'-diphenyl diisocyanate, 2-naphthyl isocyanate, 1,2,3,4-tetrahydro-2-naphthyl isocyanate, 7-methyl-1-naphthyl isocyanate, 2-methyl-1-naphthyl isocyanate, 4-methyl-1-naphthyl isocyanate, 2-chloro-1-naphthyl isocyanate, 4-chloro-1-naphthyl isocyanate, 7-chloro-1-naphthyl isocyanate, 8-chloro-1-naphthyl isocyanate, 4-chloro-2-methyl-1-naphthyl isocyanate, 2,4-dichloro-1-naphthyl isocyanate, 4,7-dichloro-1-naphthyl isocyanate, 5,7-dichloro-1-naphthyl isocyanate, 5,8-dichloro-1-naphthyl isocyanate, the bromo derivatives corresponding to the above chloro compounds, 2-nitro-1-naphthyl isocyanate, 4-nitro-1-naphthyl isocyanate, 5-nitro-1-naphthyl isocyanate, 8-nitro-1-naphthyl isocyanate, 4-chloro-2-nitro-1-naphthyl isocyanate, 2,4-dinitro-1-naphthyl isocyanate, 4,5-dinitro-1-naphthyl isocyanate, 4,8-dinitro-1-naphthyl isocyanate, 1-chloro-2-naphthyl isocyanate, 5,8-dichloro-2-naphthyl isocyanate, 1,3,4-trichloro - 2 - naphthyl isocyanate, 1,6-dichloro-2-naphthyl isocyanate, 1-nitro-2-naphthyl isocyanate, 5-nitro-2-naphthyl isocyanate, 6-bromo-1-nitro-2-naphthyl isocyanate, 1,5-dinitro-2-naphthyl isocyanate, 1,6-dinitro-2-naphthyl isocyanate, 1,8-dinitro-2-naphthyl isocyanate, 1-methyl-2-naphthyl isocyanate, 1,4-dimethyl-2-naphthyl isocyanate, 1-anthracene isocyanate, 2-anthracene isocyanate, 9-anthracene isocyanate, 2-phenanthrene isocyanate, 4-phenanthrene isocyanate, 9-phenanthrene isocyanate, 1,2-naphthalene diisocyanate, 4-chloro-1,2-naphthalene diisocyanate, 4-methyl-1,2-naphthalene diisocyanate, 1,3-naphthalene diisocyanate, 1,4-naphthalene diisocyanate, 1,5-naphthalene diisocyanate, 1,6-naphthalene diisocyanate, 1,7-naphthalene diisocyanate, 1,8-naphthalene diisocyanate, 4-chloro-1,8-naphthalene diisocyanate, 2,3-naphthalene diisocyanate, 2,7-naphthalene diisocyanate, 1,8-dinitro-2,7-naphthalene diisocyanate, 1-methyl-2,4-naphthalene diisocyanate, 1-methyl - 5,7 - naphthalene diisocyanate, 6-methyl-1,3-naphthalene diisocyanate, 7-methyl-1,3-naphthalene diisocyanate, ethyl isocyanate, propyl isocyanate, butyl isocyanate, hexyl isocyanate, cyclopentyl isocyanate, 1,6-hexane diisocyanate, undecyl isocyanate, otadecyl isocyanate, cyclohexyl isocyanate, 1,10-decane diisocyanate, carboethoxymethyl isocyanate, 1,3-cyclohexane diisocyanate, 1,4-cyclohexane diisocyanate, allyl isocyanate, 3-chloro-1-propyl isocyanate, p-ethoxyphenyl isocyanate, 1,8-octane diisocyanate, 2-pyridine isocyanate, 2-quinoline isocyanate and 1,12-dodecane diisocyanate.

The monoisocyanate above give monocarbodiimides while the polyisocyanates give polycarbodiimides (molecules containing more than one carbodiimide group, not polymers formed by the polymerization of the carbodiimide group itself). The latter can be allowed to polymerize to completion or, if desired, the molecular weight of the polymer can be controlled by adding an alcohol after a predetermined amount of carbon dioxide has evolved to stop the growing polymer chains (see Smeltz, U.S. 2,941,983).

The present invention is carried out by mixing the isocyanate, the catalyst and, optionally, the organic solvent free from Zerewitinoff active hydrogen under anhydrous conditions in a suitable reaction vessel and heating the mixture at from 100° C. to about 250° C. until the evolution of carbon dioxide ceases, in the case of monoisocyanates, or until a predetermined amount of carbon dioxide is released in the case of polyisocyanates. The solvent, if used, should have a boiling point at least as high as the desired reaction temperature. At lower temperatures, toluene can be used; at higher temperatures the xylenes or orthodichlorobenzene are suitable. The presence of a solvent makes isolation of the product somewhat simpler since fewer side reactions leading to tar formation occur and the product can be removed from the reaction vessel as a solution after cooling. Most of the carbodiimides are solids (the diphenyl and di-o-tolyl compounds are two exceptions) which requires removing them from the reaction vessel while hot if no solvent is used.

The following examples illustrate the invention with respect to operating conditions, types of catalysts and types of useful isocyanates. It is, of course, understood that these examples are meant to illustrate and not limit the invention. Parts are by weight unless otherwise indicated.

EXAMPLE 1

A mixture of 0.746 mole of p-tolyl isocyanate and 0.00024 mole of an organo-metallic catalyst of the formula $Ba[(C_4H_9)_2B(OC_4H_9)_2]_2$ is placed in a dry reaction vessel. The vessel is equipped with an agitator, a dry nitrogen sweep, a reflux condenser and weighing bulb filled with a form of sodium hydroxide absorbed on asbestos for measuring the carbon dioxide evolution. Any convenient device for measuring the carbon dioxide evolution can be used. The carbon dioxide measuring device is necessary when testing catalysts to determine the extent of reaction. When sufficient experience has been gained with a particular system of isocyanate and catalyst, it can be omitted.

The vessel is maintained at a temperature of 120° C. for three hours. The p-tolyl carbodiimide of the reaction product is identified by its infrared absorption spectrum.

EXAMPLE 2

A mixture of 0.746 mole of p-tolyl isocyanate and 0.00024 mole of an organo-metallic catalyst of the formula $Mg[Al(OC_{18}H_{37})_4]_2$ is placed in a reaction vessel as described in Example 1. The vessel is maintained at 120° C. for three hours and an infrared absorption spectrum of the reaction product shows the formation of the carbodiimide group.

EXAMPLE 3

Into a reaction vessel as described in Example 1 is placed 0.0017 mole of an organo-metallic catalyst of the formula $Mg[B(OCH_3)_4]_2$ and 0.746 mole of p-tolyl isocyanate. The vessel is maintained at a temperature of 120° C. for three hours. Infrared analysis of the reaction product shows a characteristic carbodiimide infrared peak (split) at 4.7–4.75 microns.

Table I

The following other carbodiimides have been prepared. Their physical properties are shown below:

| RN=C=NR; R equals— | M. P., °C. | B. P./mm., °C. |
|---|---|---|
| o-Chlorophenyl | | 143/0.3 |
| m-Tolyl | 118–119 | |
| Allyl | | 58–59/10 |
| 2-Methyl-3-chlorophenyl | 64–66 | |
| o-Ethoxyphenyl | 98–99 | |
| n-Butyl | | 84–85/10 |
| Ethyl | | 24.5/11 |
| Isobutyl | | 72/10 |
| Isopropyl | | 160/atm. |
| n-Propyl | | 53/10 |
| 2-Pyridyl | 137 | |
| 4-Bromophenyl | | 202/10 |
| 2-Bromophenyl | 98–100 | |
| 4-Carboethoxyphenyl | 90 | |
| 2,4-Dibromophenyl | 156–157 | |
| 2,5-Dibromophenyl | 172–173 | |
| 4-Diethylaminophenyl | 81–82 | |
| 4-Dimethylaminophenyl | 89–90 | |
| 4-Isobutylphenyl | 189 | |
| 2-Naphthyl | 145–146 | |
| 4-n-Propylphenyl | 168 | |
| tert. Butyl | | 140/atm. |
| 4-Iodophenyl | 90 | |
| Phenyl | | 163/11 |
| Cyclohexyl | | |
| p-Nitrophenyl | 164–167 | |
| p-Chlorophenyl | oil | |
| p-Tolyl | 55 | |
| 1-Naphthyl | 93–95 | |

As many widely different embodiments of this invention may be made without departing from the spirit and scope thereof, it is to be understood that this invention is not limited to the specific embodiments thereof except as defined in the appended claims.

What is claimed is:

1. A process for preparing organic carbodiimides which comprises heating in the range of from about 100° C. to 250° C. under anhydrous conditions in organic isocyanate containing 1 to 3 isocyanate groups and selected from the group consisting of carbocyclic aromatic isocyanates containing from one to three rings, saturated aliphatic isocyanates containing from two to eighteen carbons in the aliphatic group, pyridine isocyanates and quinoline isocyanates, said isocyanate being free of Zerewitinoff active hydrogen, and an organometallic catalyst of the formula $$M'[R_aM^2(OR')_{4-a}]_w$$

where M' is selected from the group consisting of the alkali metals and the alkaline earth metals, M² is selected from the group consisting of boron and aluminum, R and R' are Zerewitinoff active hydrogen free alkyl groups, w is the valence of M' and a is from 0 to two.

2. A process for preparing organic carbodiimides which comprises heating in the range of from about 100° C. to 250° C. under anhydrous conditions an organic isocyanate containing 1 to 3 isocyanate groups and selected from the group consisting of carbocyclic aromatic isocyanates containing from one to three rings, saturated aliphatic isocyanates containing from two to eighteen carbons in the aliphatic group, pyridine isocyanates and quinoline isocyanates, said isocyanate being free of Zerewitinoff active hydrogen, and an organometallic catalyst of the formula $$Ba[(C_4H_9)_2B(OC_4H_9)_2]_2$$

3. A process for preparing organic carbodiimides which comprises heating in the range of from about 100° C. to 250° C. under anhydrous conditions an organic isocyanate containing 1 to 3 isocyanate groups and selected from the group consisting of carbocyclic aromatic isocyanates containing from one to three rings, saturated aliphatic isocyanates containing from two to eighteen carbons in the aliphatic group, pyridine isocyanates and quinoline isocyanates, said isocyanate being free of Zerewitinoff active hydrogen, and an organometallic catalyst of the formula $$Mg[Al(OC_{18}H_{37})_4]_2$$

4. A process for preparing organic carbodiimides which comprises heating in the range of from about 100° C. to 250° C. under anhydrous conditions in organic isocyanate containing 1 to 3 isocyanate groups and selected from the group consisting of carbocyclic aromatic isocyanates containing from one to three rings, saturated aliphatic isocyanates containing from two to eighteen carbons in the aliphatic group, pyridine isocyanates and quinoline isocyanates, said isocyanate being free of Zerewitinoff active hydrogen, and an organometallic catalyst of the formula $Mg[B(OCH_3)_4]_2$.

5. A process for preparing organic carbodiimides which comprises heating in the range of from about 100° C. to 250° C. under anhydrous conditions an organic isocyanate containing 1 to 3 isocyanate groups and selected from the group consisting of carbocyclic aromatic isocyanates containing from one to three rings, saturated aliphatic isocyanates containing from two to eighteen carbons in the aliphatic group, pyridine isocyanates and quinoline isocyanates, said isocyanate being free of Zerewitinoff active hydrogen, and an organometallic catalyst of the formula $$M'[R_aM^2(OR')_{4-a}]_w$$

where M' is selected from the group consisting of the alkali metals and the alkaline earth metals, M² is selected from the group consisting of boron and aluminum, R is Zerewitinoff active hydrogen free alkyl of from 1 to 4 carbon atoms, R' is Zerewitinoff active hydrogen free alkyl of from 1 to 18 carbon atoms, w is the valence of M' and a is from 0 to two.

References Cited in the file of this patent

UNITED STATES PATENTS

| 2,853,473 | Campbell et al. | Sept. 23, 1958 |
| 2,941,966 | Campbell | June 21, 1960 |

FOREIGN PATENTS

| 579,654 | Canada | July 14, 1959 |

OTHER REFERENCES

Bergmann: The Chemistry of Acetylene and Related Compounds, p. 80 (1948).

Dyer et al.: Journ. of Organic Chemistry, vol. 26, pages 4677 to 4678 (November 1961).